US011930109B2

(12) United States Patent
Hetzler et al.

(10) Patent No.: US 11,930,109 B2
(45) Date of Patent: Mar. 12, 2024

(54) ENCRYPTED STORAGE WITH SECURE ACCESS

(71) Applicant: International Business Machines Corporation, Armonk, NY (US)

(72) Inventors: Steven Robert Hetzler, Los Altos, CA (US); Wayne C. Hineman, San Jose, CA (US); John Stewart Best, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 17/156,159

(22) Filed: Jan. 22, 2021

(65) Prior Publication Data
US 2022/0239480 A1    Jul. 28, 2022

(51) Int. Cl.
*H04L 9/08* (2006.01)
*G06F 3/06* (2006.01)

(52) U.S. Cl.
CPC .......... *H04L 9/0894* (2013.01); *G06F 3/0622* (2013.01); *G06F 3/0659* (2013.01); *G06F 3/067* (2013.01); *H04L 9/0825* (2013.01); *H04L 9/0861* (2013.01)

(58) Field of Classification Search
CPC ... H04L 9/0894; H04L 9/0825; H04L 9/0861; G06F 3/0622; G06F 3/0659; G06F 3/067
USPC ....................................................... 713/168
See application file for complete search history.

(56) References Cited

U.S. PATENT DOCUMENTS

| | | | | |
|---|---|---|---|---|
| 8,397,084 B2* | 3/2013 | Ranade | ................. | H04L 9/3236 |
| | | | | 705/52 |
| 9,141,822 B2* | 9/2015 | Lehnhardt | ............... | G06F 16/27 |
| 9,253,166 B2 | 2/2016 | Gauda | | |
| 11,349,644 B1* | 5/2022 | Stapleton | .............. | H04L 9/0869 |
| 2017/0012784 A1* | 1/2017 | Cross | .................... | H04L 9/3263 |
| 2020/0034528 A1* | 1/2020 | Yang | .................. | G06F 21/6209 |
| 2021/0165909 A1* | 6/2021 | Park | ...................... | G06F 11/366 |
| 2021/0271749 A1* | 9/2021 | Mendonsa | ............ | H04L 9/0825 |

OTHER PUBLICATIONS

Nabeel et al., "Privacy Preserving Delegated Access Control in Public Clouds," IEEE Transactions on Knowledge and Data Engineering, vol. 26, No. 9, Sep. 2014, pp. 2268-2280.
Yan et al., "Heterogeneous Data Storage Management with Deduplication in Cloud Computing," IEEE Transactions on Big Data, vol. 5, No. 3, Jan. 1, 2019, 15 pages.

(Continued)

*Primary Examiner* — Kambiz Zand
*Assistant Examiner* — Phuc Pham
(74) *Attorney, Agent, or Firm* — Zilka-Kotab, P.C.

(57) ABSTRACT

A computer-implemented method includes receiving, by a storage system, encrypted data and a set of key identifiers. Each key identifier is associated with information specifying a storage location for which the key identifier is authorized. The method also includes storing, by the storage system, the encrypted data in at least one storage location and receiving, by the storage system, at least one key identifier of the set of key identifiers with a data access request. The method includes determining, by the storage system, whether the data access request is authorized for the at least one key identifier.

20 Claims, 7 Drawing Sheets

(56) References Cited

OTHER PUBLICATIONS

Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Version 15, Oct. 7, 2009, pp. 1-2.
Mell et al., "The NIST Definition of Cloud Computing," Recommendations of the National Institute of Standards and Technology, NIST Special Publication 800-145, Sep. 2011, pp. 1-7.
CSRC, "Cloud Computing," Computer Security Resource Center, Oct. 2017, 3 pages, retrieved from https://csrc.nist.gov/projects/cloud-computing.
Hetzler, S., U.S. Appl. No. 16/544,708, filed Aug. 19, 2019.
Hetzler et al., U.S. Appl. No. 16/938,459, filed Jul. 24, 2020.

\* cited by examiner

KeyID List Client1 g0 — 404

| KeyID Ref # | KeyID | Level | Loc | Attr | |
|---|---|---|---|---|---|
| h0 | k0.0 | root | L0, L1 | | — 406 |
| h0.1 | k0.1 | child | L0 | | — 408 |
| h0.3 | k0.3 | child | L0.1 | 24h | — 410 |
| h1 | k1.0 | root | L2 | | — 412 |

Storage KeyID Loc List — 414

| Loc | Encode KeyID Ref # | Add'l KeyID Ref # | |
|---|---|---|---|
| L0 | h0 | h0.1 | — 416 |
| L0.1 | h0 | h0.1, h0.3 | — 418 |
| L1 | h0 | | — 420 |
| L2 | h1 | | — 422 |

FIG. 4

KeyID Manager

Client1 KeyID List Key Ref # 0 (k0) — 504

| KeyID Ref # | Level | KeyID | Loc | Attr |
|---|---|---|---|---|
| 0 | root | k0.0 | L0, L1 | |
| 1 | child | k0.1 | L0 | |
| 2 | child | k0.2 | L0.1 | expire |
| 3 | child | k0.3 | L0.1 | 24h |

Storage 1 KeyID List Client1 g0 — 506

| KeyID Ref # | KeyID | Level | Loc | Attr |
|---|---|---|---|---|
| h0 | k0.0 | root | L0, L1 | |
| h0.1 | k0.1 | child | L0 | |
| h0.3 | k0.3 | child | L0.1 | 24h |
| h1 | k1.0 | root | L2 | |

FIG. 5

ENCRYPTED STORAGE WITH SECURE ACCESS

BACKGROUND

The present invention relates to encrypted storage with secure access, and more particularly, this invention relates to key identifiers associated with encryption keys for facilitating controlled access to data in cloud storage systems and networks.

Multi-factor authentication, including two-factor authentication, includes electronic authentication which is used to grant users access to websites or applications after successfully presenting a plurality of factors to an authentication mechanism. Such authentication mechanisms are conventionally used to protect users from unknown entities trying to access data associated with the user.

BRIEF SUMMARY

A computer-implemented method, according to one embodiment, includes receiving, by a storage system, encrypted data and a set of key identifiers. Each key identifier is associated with information specifying a storage location for which the key identifier is authorized. The method also includes storing, by the storage system, the encrypted data in at least one storage location and receiving, by the storage system, at least one key identifier of the set of key identifiers with a data access request. The method includes determining, by the storage system, whether the data access request is authorized for the at least one key identifier.

A computer program product, according to another embodiment, includes one or more computer readable storage media and program instructions collectively stored on the one or more computer readable storage media. The program instructions include program instructions to encrypt data using an encryption key. The encryption key is associated with a set of key identifiers. The program instructions also include program instructions to provide a storage system with the set of key identifiers. Each key identifier is associated with information specifying a storage location the key identifier is authorized for. The program instructions also include program instructions to send at least one key identifier of the set of key identifiers to the storage system with a data access request. The storage system determines whether the data access request is authorized for the at least one key identifier.

A system, according to yet another embodiment, includes a client side system. The client side system includes a first processor and logic integrated with the first processor, executable by the first processor, or integrated with and executable by the first processor. The logic is configured to encrypt, by the first processor, data using an encryption key. The encryption key is associated with a set of key identifiers. The logic is configured to provide, by the first processor, a storage system with the set of key identifiers. Each key identifier is associated with information specifying a storage location the key identifier is authorized for. The logic is also configured to send, by the first processor, at least one key identifier of the set of key identifiers to the storage system with a data access request. The storage system is configured to determine whether the data access request is authorized for the at least one key identifier. The system also includes the storage system. The storage system includes a second processor and logic integrated with the second processor, executable by the second processor, or integrated with and executable by the second processor. The logic is configured to receive, by the second processor, the encrypted data and the set of key identifiers and store, by the second processor, the encrypted data in at least one storage location. The logic is also configured to receive, by the second processor, the at least one key identifier of the set of key identifiers with the data access request and determine, by the second processor, whether the data access request is authorized for the at least one key identifier.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4 is a diagram of a high-level architecture, in accordance with one aspect of the present invention.

FIG. 5 is a diagram of a high-level architecture, in accordance with one aspect of the present invention.

DETAILED DESCRIPTION

Figure 1:
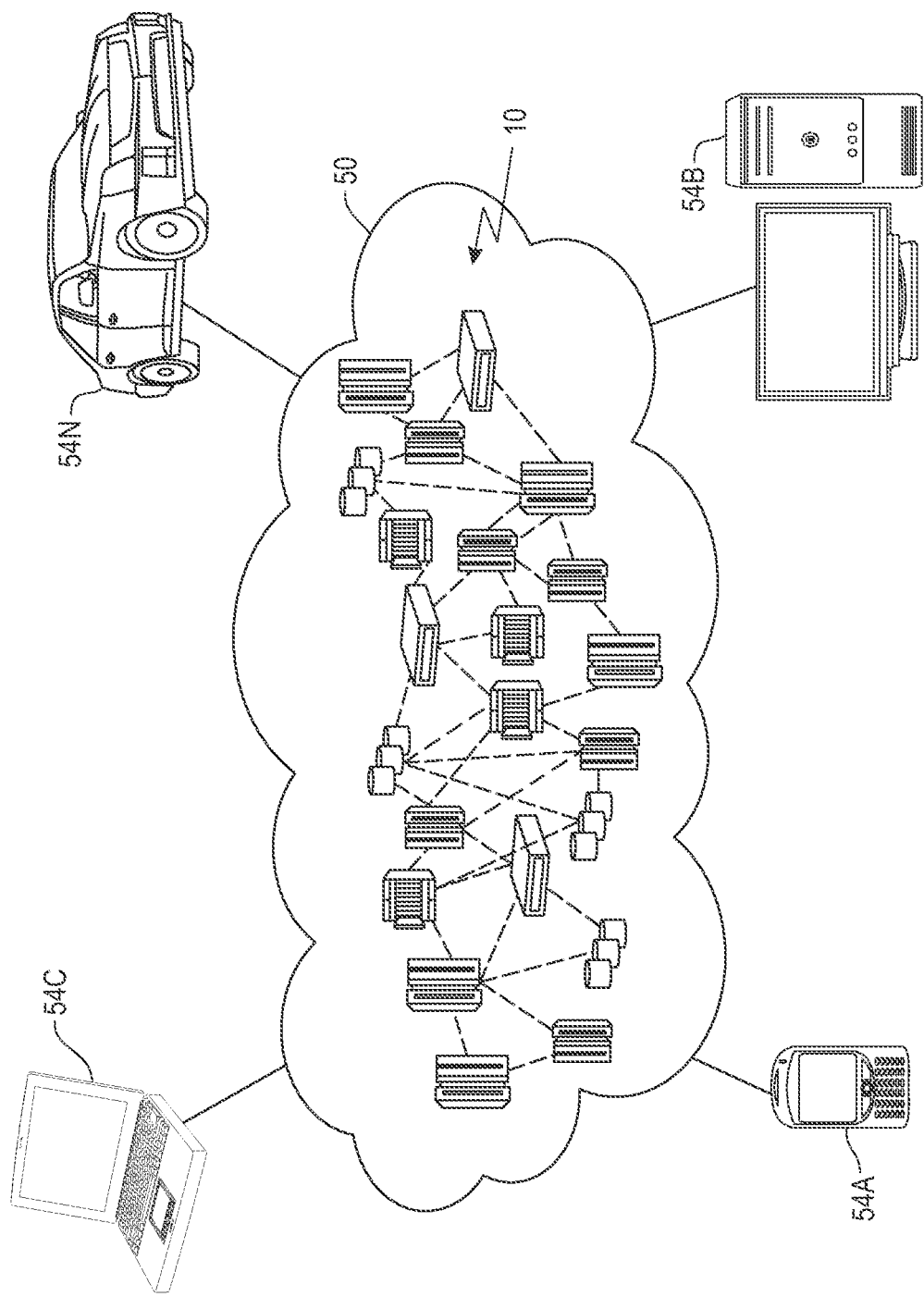
FIG. 1 depicts a cloud computing environment in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of key identifiers associated with encryption keys to facilitate controlled access to data in storage system.

In one general embodiment, a computer-implemented method includes receiving, by a storage system, encrypted data and a set of key identifiers. Each key identifier is associated with information specifying a storage location for which the key identifier is authorized. The method also includes storing, by the storage system, the encrypted data in at least one storage location and receiving, by the storage system, at least one key identifier of the set of key identifiers with a data access request. The method includes determining, by the storage system, whether the data access request is authorized for the at least one key identifier.

In another general embodiment, a computer program product includes one or more computer readable storage media and program instructions collectively stored on the one or more computer readable storage media. The program instructions include program instructions to encrypt data using an encryption key. The encryption key is associated with a set of key identifiers. The program instructions also include program instructions to provide a storage system with the set of key identifiers. Each key identifier is associated with information specifying a storage location the key identifier is authorized for. The program instructions also include program instructions to send at least one key identifier of the set of key identifiers to the storage system with a data access request. The storage system determines whether the data access request is authorized for the at least one key identifier.

In yet another general embodiment, a system includes a client side system. The client side system includes a first processor and logic integrated with the first processor, executable by the first processor, or integrated with and executable by the first processor. The logic is configured to encrypt, by the first processor, data using an encryption key. The encryption key is associated with a set of key identifiers. The logic is configured to provide, by the first processor, a storage system with the set of key identifiers. Each key identifier is associated with information specifying a storage location the key identifier is authorized for. The logic is also configured to send, by the first processor, at least one key identifier of the set of key identifiers to the storage system with a data access request. The storage system is configured to determine whether the data access request is authorized for the at least one key identifier. The system also includes the storage system. The storage system includes a second processor and logic integrated with the second processor, executable by the second processor, or integrated with and executable by the second processor. The logic is configured to receive, by the second processor, the encrypted data and the set of key identifiers and store, by the second processor, the encrypted data in at least one storage location. The logic is also configured to receive, by the second processor, the at least one key identifier of the set of key identifiers with the data access request and determine, by the second processor, whether the data access request is authorized for the at least one key identifier.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
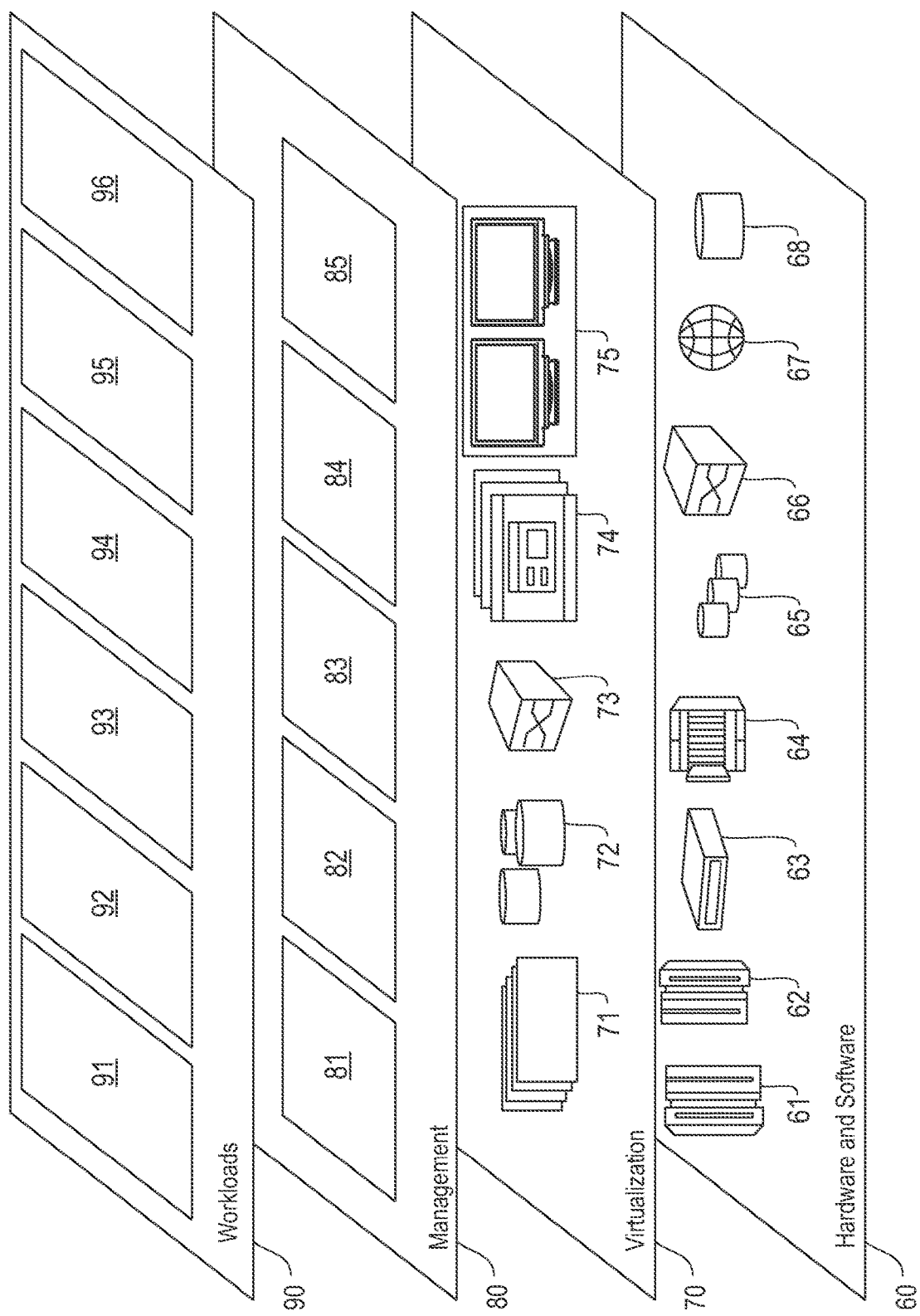
FIG. 2 depicts abstraction model layers in accordance with one embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and encrypted storage with secure access 96.

Multi-factor authentication, including two-factor authentication, includes electronic authentication which is used to grant users access to websites or applications after successfully presenting a plurality of factors to an authentication mechanism. Such authentication mechanisms are conventionally used to protect users from unknown entities trying to access data associated with the user. In some conventional authentication techniques, the authentication mechanism requires knowledge of the user, possession of the user, and inheritance (e.g., having to do with the identity of the user). These conventional authentication techniques are used as a connection mechanism.

In contrast, various aspects of the present disclosure increase the security in storage systems by introducing an additional authentication factor that a user of the storage system produces to access data associated with the additional authentication factor. In preferred aspects, the additional authentication factor is a key identifier (e.g., keyID) for fine-grained authentication of specific data stored by the storage system (e.g., in contrast to a connection mechanism which allows broad access).

Various approaches described herein provide the ability for a client to control access to encrypted data in a storage system without the storage system having access to the client secret encryption key(s). At least some aspects of the present disclosure provide key identifiers which are related to an encryption key and the keyIDs are used to provide secure access to locations in the data. The present disclosure improves data security by creating multiple keyIDs for an encryption key, attributes for the keyIDs, etc. The keyIDs and various corresponding attributes may be used to improve access control for stored data, thereby improving the security of the system.

In exemplary aspects of the present disclosure, a client stores encrypted data on a storage system. The client provides key identifiers which are associated with the encryption key used to encrypt the data. The client and/or other users present a key identifier to the storage system in order to access the encrypted data and the storage system determines whether the data access request is authorized for the key identifier. The clients and/or the other authorized users preferably have the encryption key used for decrypting the data in a manner which would become apparent to one having ordinary skill in the art upon reading the present disclosure. In preferred aspects, the storage system does not have access to the encryption key.

In at least some embodiments, an encryption key may be associated with a plurality of keyIDs. Each keyID may be associated with a different region of data stored on the storage system and/or different attributes (e.g., temporal limitations, operational limitations, etc.). For example, an owner of the data may be associated with a high-level key identifier (e.g., associated with an encryption key) which gives full permissions (e.g., allows read/write operations without expiration) to all of the data stored on the storage system. Another client may be associated with a different key identifier (e.g., which is associated with the same encryption key) which gives permissions to portions of the data stored on the storage system. Another client's key identifier may expire after a predetermined period of time according to at least some aspects described herein.

At least some of the operations described herein may be used with symmetric key encryption and/or asymmetric key encryption (e.g., public key infrastructure (PKI)). It should be understood by one having ordinary skill in the art that PKI encryption may be performed according to any configurations known in the art. For example, a public key in PKI is not a secret key, and encrypting data with the public key requires a corresponding secret private key to decrypt. A secret key as referred to throughout the present disclosure refers to a key which is not shared between the client and the storage system. For example, the encryption key may be a client secret key which the storage system does not have access to.

Clients throughout various aspects of the present disclosure are associated with a set of processes, users, other entities, etc., which have separate data access privileges. For security, each of the foregoing entities may have a secret data key for encrypting its data. As used throughout the present disclosure, an entity that has its own secret key is referred to as a key user. Subsets of key users may be referred to as key groups. For example, a client may have secret keys k0, k1, k2 . . . k7, wherein keys k0, k1, and k2 form key group 1 (e.g., g1) and secret keys k3, k4, k5, form key group 2 (e.g., g2). Access control may be provided by a client restricting access to key users that are members of the key group in a manner that would be understood by one having ordinary skill in the art upon reading the present disclosure. Access control may be provided by restricting access of a key user to a specific key in the key group in a manner that would be understood by one having ordinary skill in the art upon reading the present disclosure.

A keyID may be associated with a storage location for the data to ensure that only data associated with a matching keyID is returned for a data access request. Subsequent data access requests include the keyID associated with the client secret data key used to encrypt the data. The keyID may be a part of a specific message. The keyID may be part of an established session, process, etc.

Figure 3:
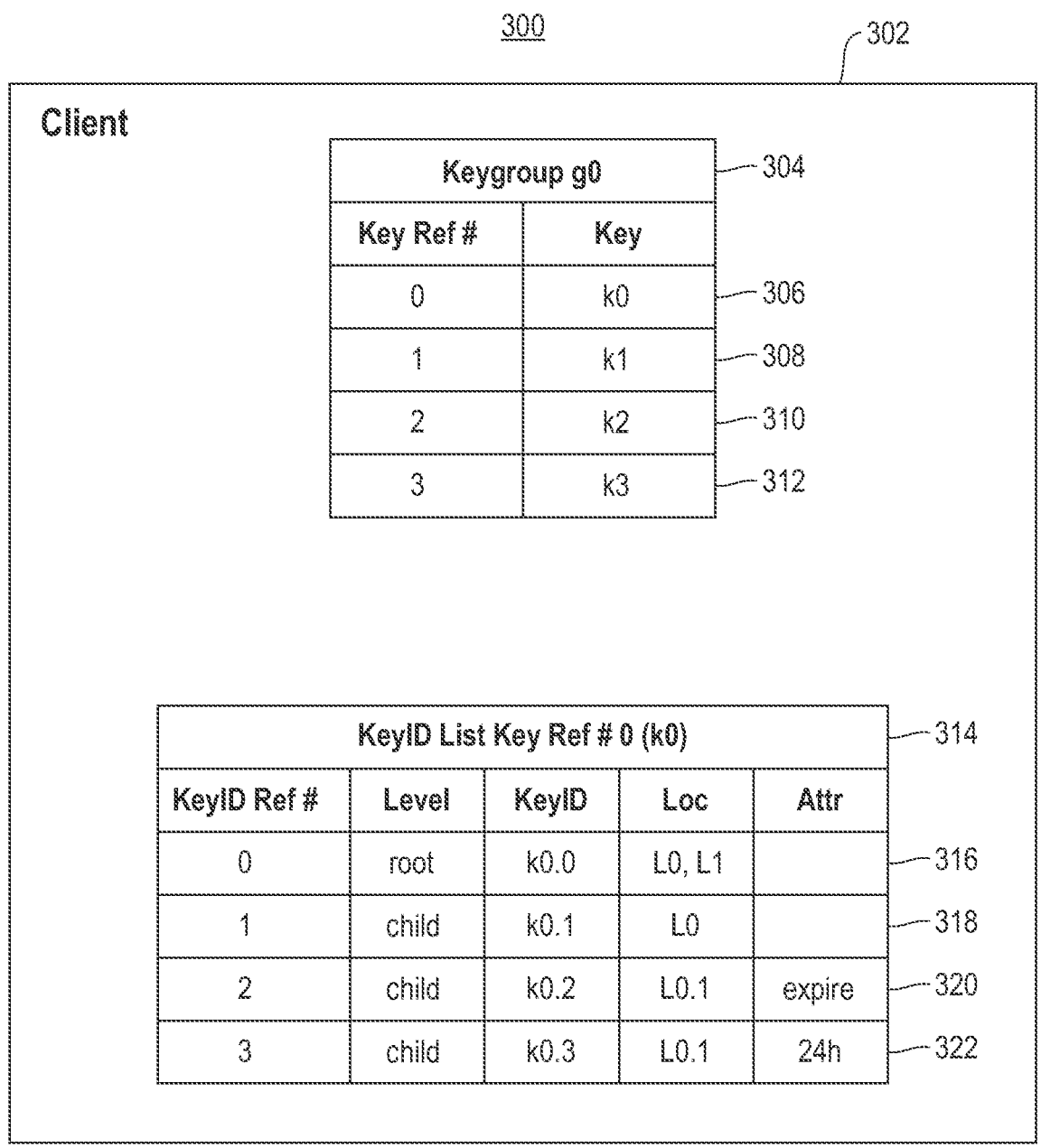
FIG. 3 is a diagram of a high-level architecture, in accordance with one aspect of the present invention.

FIG. 3 depicts a high-level architecture, in accordance with various configurations. The architecture 300 may be implemented in accordance with the present invention in any of the environments depicted in FIGS. 1-2 and 4-7, among others, in various configurations. Of course, more, or less elements than those specifically described in FIG. 3 may be included in architecture 300, as would be understood by one of skill in the art upon reading the present descriptions.

Architecture 300 includes a client-side implementation of at least some aspects of the present disclosure. Client 302 includes key group g0 table 304. Key group g0 includes a set of secret keys (k0, k1, k2, and k3). Each key has as associated key reference number (e.g., key ref #). For example, key k0 has a reference number 0 at row 306, key k1 has a reference number 1 at row 308, key k2 has a reference number 2 at line 310, and key k3 has a reference number 3 at row 312. The reference numbers are used by the client 302 to identify the key. In various approaches, the client 302 may use the reference numbers to identify the key using a lookup table. The key reference number is not secure (e.g., it may be easily guessed), in at least some aspects.

The keyIDs are more secure. In preferred approaches, the keyIDs are not easily predictable and/or determinable from the key itself. A random value and/or a value encrypted in a separate key may be used to generate keyIDs. Any other technique for generating the keyIDs may be used. KeyIDs which are not easily predictable and/or determinable from the key itself prevent unauthorized entities from gaining access to the storage. For example, malware may be prevented from gaining access to a process authorized for a given client secret data keyID. It is beneficial to make it relatively difficult for the process to use the information to deduce other keyID values, thereby limiting the ability to exfiltrate and/or alter data in other keys.

In one exemplary approach, a key generator (e.g., a keyID generator) may be used to create keyID values that are not easily guessed based on the key or key reference number. In another approach, a secret keyID seed and keyID counter may provide inputs to the keyID generator to create unique secure keyIDs. In response to a client-issued request for a new keyID to the keyID counter, the keyID counter sends the current count to the keyID generator and increments the count in a manner which would become apparent to one having ordinary skill in the art upon reading the present disclosure. The count may be persistent. In one aspect, the keyID generator is an encrypter and encrypts the keyID count using the keyID seed as the encryption key input to produce a secure, unique keyID. The keyID count value used to create the keyID may be output. A client may use the keyID count as the keyID reference number and a unique keyID.

In various approaches, a set of keyIDs may include a root keyID and a plurality of child keyIDs which are derived from the root keyID. The root keyID is preferably a permanent keyID (e.g., it does not expire) and the root keyID is associated with the highest level of access privileges. The child keyIDs each have different sub-permissions associated with a region of the data and/or a temporal limitation for access. In general, child keyIDs, according to various embodiments, inherit the permissions and attributes of the root keyID, unless the child keyIDs are further restricted.

In at least some approaches, a given key may be associated with more than one keyID. For example, the keyIDs may be used to restrict access to a subset of privileges associated with the key and/or the data. Client 302 comprises a keyID table 314 for a given key (e.g., key k0). The keyID table 314 includes the key reference number from key group g0 table 304 (e.g., from row 306, key reference 0 associated with key k0). The keyID table 314 includes information on each keyID associated with the reference key (e.g., key k0). KeyID information may include a keyID reference number, a keyID level (e.g., a root keyID, a child keyID, etc.), the keyID itself, the storage locations the keyID is authorized for, storage location information, other attributes, etc. Attributes may include the lifetime of the key, operational limits of the key (e.g., temporal limitations), etc. The storage location information may be volume and/or LBA ranges for block storage, bucket, object names for an object store, directories and/or files for a file store, etc.

In the exemplary keyID table 314, 4 keyIDs have been created for the key k0. To populate the keyID table 314, client 302 issues 4 create new keyID requests and stores the keyID reference numbers and keyIDs in the keyID table 314, in some approaches. The create new keyID requests may be issued to a keyID manager (not shown) on or coupled to the client 302. At row 316, the keyID reference number is 0 as returned by the keyID counter with keyID k0.0, in at least one approach. The keyID k0.0 may be the root keyID for key k0. Client 302 may authorize the keyID for storage locations (e.g., the "loc" column in the keyID table 314) L0 and L1. The next keyIDs are also associated with the key k0 and the next keyIDs are the children of the root keyID. Child keyID k0.1 is shown in row 318, child keyID k0.2 is shown in line 320, and child keyID k0.3 is shown in row 322. At row 318, keyID k0.1 is restricted to location L0. At line 320, keyID k0.2 is restricted to location L0.1 (e.g., a subset of L0). Further, as shown in the attributes (e.g., the "attr" column in the keyID table 314), keyID k0.2 was a temporary access keyID, which has expired. Any future data access request using the keyID k0.2 is denied, in various approaches. At row 322, keyID k0.3 is restricted to location L0.1 and has 24 hours remaining on its access privilege, as indicated by the attributes.

While the keyID function has been described as residing on the client 302, the function may be located in a separate keyID manager, in the storage system, etc. For data security and privacy, it is important not to share the keys with the storage. In one approach, the keys are handled by a separate key manager which manages and/or generates the keys in a manner known in the art. For example, a designer of the storage system may wish to increase security by separating the functions of the keyID manager and the key manager. In some approaches, the keyID manager and the key manager may be located on physically separate devices. The storage system may be coupled to the keyID manager and use the keyID manager to access the keyIDs. The storage system may store the keyIDs and use the stored keyIDs (and any associated keyID information) to determine whether data access requests are authorized. In any approach, it is desirable to prevent the storage system from having access to the keys (e.g., via the key manager) used to encrypt the data stored thereon by physical separation, permissions, etc.

In various approaches, keyIDs may be associated with temporal limitations such as expiration after 2 hours, 24 hours, 48 hours, etc. In some approaches, the keyIDs may be limited in the number of operations using the keyID (e.g., a predetermined number of data access requests). Expired keyIDs may be removed from the list of available keyIDs such that any future data request using that keyID is determined by the storage system to be not valid (e.g., not authorized, etc.). KeyIDs may be revoked in any manner known in the art. In some approaches, a revoked keyID may be replaced with zeros, a randomly generated keyID, or any other dummy keyID, in a manner which would be understood by one having ordinary skill in the art.

In various aspects, it may be beneficial to maintain a log of expired keyIDs. A log of expired keyIDs may be useful for recognizing a client which has not updated its keyID, rather than identifying an entity which uses an unrecognized keyID (e.g., in this case, an expired keyID) as an attack. For example, if an expired keyID is deleted substantially at the time that the temporal limitation expires, a data access request using the keyID may come in relatively shortly after which will be flagged as an access warning, in some approaches, even though the request was legitimate (e.g., not an attack attempt). In some approaches, it may be beneficial to keep a log of expired key IDs in order to inform a user that the keyID has expired, according to the security designs of the storage system.

In at least some approaches, the storage system does not accept data requests in revoked keyIDs. In this way, the client does not have to re-encrypt all of the data on the storage system with a new encryption key each time the client wishes to modify another user's access to the data or regions thereof, thereby saving significant time associated with re-encryption processes.

FIG. 4 depicts a high-level architecture, in accordance with various configurations. The architecture 400 may be implemented in accordance with the present invention in any of the environments depicted in FIGS. 1-3 and 5-7, among others, in various configurations. Of course, more, or less elements than those specifically described in FIG. 4 may be included in architecture 400, as would be understood by one of skill in the art upon reading the present descriptions.

Architecture 400 includes a storage-side implementation of at least some aspects of the present disclosure. Clients may provide the storage system with the keyIDs and associated access privileges as discussed with reference to FIG. 3. FIG. 4 shows an exemplary implementation of storage system 402 comprising a keyID table 404 for client 1, key group g0. The storage system 402 comprises a keyID table for each key in a set of keys which includes information on the set of keyIDs the client uses for future and/or current operations associated with each key. The keyID information and any relevant updates are delivered by the client to the storage system 402 prior to the associated keyIDs being used for data access. In exemplary architecture 400, row 406 includes information associated with key k0.0 from the exemplary implementation of FIG. 3. The storage system 402 uses its own keyID reference number to manage each keyID. Row 408 includes information for keyID k0.1, row 410 includes information for keyID k0.3, and row 412 includes information for keyID k1.0. In various approaches, the storage system 402 includes a similar list for each active keyID group.

The keyID group information indicates that the keyID k0.0 is a root keyID and keyID k0.1 and k0.3 are children keyIDs. A root keyID has access to all locations authorized for its children, in preferred approaches. In this exemplary architecture 400, keyID k0.2 is not shown in the keyID table 404 where keyID k0.2 is already expired (as indicated in FIG. 3). The keyID group information may be used by the storage system 402 to determine which keyIDs are authorized for each location in the storage system 402 (e.g., L0, L1, L2, etc., and subsections L0.1, etc.).

In one approach, the storage system 402 comprises keyID information for storage locations in a storage location table 414. In this exemplary architecture 400, the location information is for root keyIDs only. Thus, row 416 shows location L0 and row 418 shows location L0.1, which is a subset of L0. Furthermore, row 420 shows location L1 and row 422 shows location L2. For access in a child keyID, the storage system 402 refers to the keyID table 404 to determine the child keyID access permissions. For an access to data in location L0.1 using keyID k0.3, the storage system 402 determines from the storage location table 414 that data in location L0.1 is encoded in keyID reference number h0, and keyID k0.3 has access privileges. The storage system 402 determines from the keyID table 404 that h0 is the keyID reference number for the root keyID k0.0 at row 406 and that the keyID k0.3 is a child with access privileges to location L0.1 for 24 hours, as shown in row 410. If the access is a data write operation, the keyID reference number for the write operation of h0 may be used. The keyID information is not updated when the child key expires. For logging purposes, it is beneficial to record the actual keyID of the write request.

In various approaches, the storage system 402 may rotate key IDs without having to rewrite the keyID information by changing the keyID associated with a root keyID in a manner that would be understood by one having ordinary skill in the art upon review of the present disclosure. For example, by dereferencing a keyID, the storage system 402 may change the value of the keyID without rewriting any of the keyID information for the storage location table 414

(e.g., any access tables). In preferred aspects, it is beneficial to use the root keyID for a key group as the encoded keyID. Since the child keyIDs refer to the same key as the root keyID, no changes are made to the encoded keyID for a location when child keyID information changes, such as when a keyID expires.

In various approaches, a storage system 402 may include a storage location keyID list with the root keyID for each location, as shown in FIG. 4. In other approaches, the information may be organized in other ways, such as for each keyID (e.g., including the child keyIDs).

In various approaches, the storage keyID list information may be stored within the storage system 402, as in FIG. 4. In other approaches, the keyID list information may located in a keyID manager. See FIG. 5.

FIG. 5 depicts a high-level architecture, in accordance with various configurations. The architecture 500 may be implemented in accordance with the present invention in any of the environments depicted in FIGS. 1-4 and 6-7, among others, in various configurations. Of course, more, or less elements than those specifically described in FIG. 5 may be included in architecture 500, as would be understood by one of skill in the art upon reading the present descriptions.

Architecture 500 includes an exemplary implementation of a keyID manager having keyID information stored therein. A keyID manager may improve the functionality and reduce the load on clients and the storage system. Architecture 500 includes a keyID manager 502 which preferably supports multiple clients and/or multiple storage systems. The keyID manager 502 may be beneficial in distributed systems where keyID users may reside on different client systems. The keyID manager 502 may be coupled to various components (e.g., a plurality of clients, the storage system, etc.) in any manner known in the art.

In one optional approach, the keyID manager 502 may include keyID counters which hold the generated keyID count for the set of clients associated with the keyID manager 502. In the foregoing optional approach, the keyID manager 502 may include a keyID generator for generating and holding keyIDs associated with each of the clients associated with the keyID manager 502.

In various approaches, the keyID manager 502 may include a real-time clock resource for enabling the keyID manager 502 to act as a central clock resource in the storage system, in a manner which would become apparent to one having ordinary skill in the art upon reading the present disclosure. The real-time clock resource may ensure that lifetimes for keyIDs (e.g., the temporal limitations of 24 hours, 48 hours, 1 week, etc.) are synchronized between clients and the storage.

In at least some approaches, the keyID manager 502 may handle authentication of clients and storage, such as through a certificate authority, in a manner which would become apparent to one having ordinary skill in the art upon reading the present disclosure.

KeyID manager 502 includes a client keyID list 504 for each client root keyID. In one approach, the keyID manager 502 comprises a storage keyID list 506 for each storage system associated with the keyID manager 502.

In various approaches, the keyID manager 502 may be used with a key manager. The key manager may comprise a key generator and a key list for each key group (e.g., such as the key list in key group g0 table 304 as shown in FIG. 3).

In some approaches, the storage system applies at-rest encryption to the data in a manner which would become apparent to one having ordinary skill in the art upon reading the present disclosure. At-rest encryption beneficially provides an additional level of security for the data. For example, an attacker obtaining physical data access (e.g., such as through theft of a storage device from the storage system) would need to possess the client encryption key and the storage encryption key to bypass the additional at-rest encryption, as would be understood by one having ordinary skill in the art.

In at least some approaches, access to data may be restricted by the use of keyIDs to a subset of the data encrypted in a given key. Such restrictions are preferably in additional to other access controls (e.g., such as account-based privileges).

Figure 6:
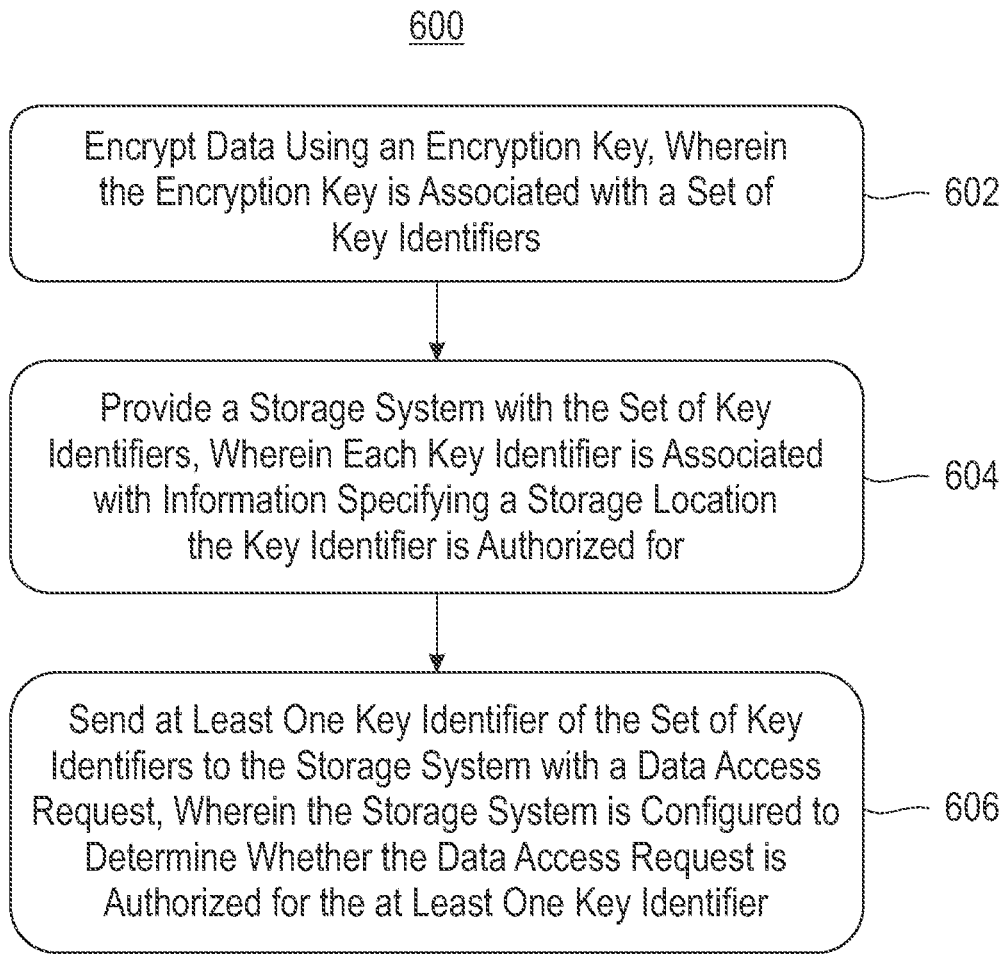
FIG. 6 is a flowchart of a method, in accordance with one aspect of the present invention.

Now referring to FIG. 6, a flowchart of a method 600 is shown according to one aspect. The method 600 may be performed in accordance with the present invention in any of the environments depicted in FIGS. 1-5 and 7, among others, in various aspects. Of course, more, or fewer operations than those specifically described in FIG. 6 may be included in method 600, as would be understood by one of skill in the art upon reading the present descriptions.

Each of the steps of the method 600 may be performed by any suitable component of the operating environment. For example, in various aspects, the method 600 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 includes operation 602. Operation 602 includes encrypting data using an encryption key. In preferred approaches, a client on a client side system encrypts data using the encryption key in a manner known in the art for storage in a storage system. The client provides the storage system with the encrypted data, in various approaches. In preferred aspects, the storage system does not have access to the encryption key. The encryption key is preferably associated with a set of key identifiers (e.g., keyIDs, discussed below in operation 604). In one approach, the encryption key may be pre-associated with the set of key identifiers. In some approaches, the encryption key is associated with the set of key identifiers after the encryption key is used to encrypt the data (e.g., in response to encrypting the data).

Operation 604 includes providing a storage system with the set of key identifiers. In various approaches, the client provides the encrypted data to the storage system where the storage system comprises a plurality of storage locations for the data. Each storage location may be referred to as a region or a range interchangeably throughout the present disclosure. In preferred approaches, each key identifier is associated with information specifying a storage location the key identifier is authorized for. Each key identifier may be associated with information specifying a plurality of storage locations the key identifier is authorized for. A specified storage location may include a plurality and/or a range of storage locations the key identifier is authorized for. In various approaches, the key identifiers may be associated with information specifying overlapping and/or encompassing storage locations the key identifier is authorized for. For example, a first key identifier may be associated with a location L0 and a second key identifier may be associated with a subset of location L0 (e.g., L0.1).

In at least some approaches, at least one key identifier is associated with an attribute including a temporal limitation, an access limitation, a keyID level, etc. For example, at least one key identifier is associated with a temporal limitation where the keyID expires after a predefined period of time. In various approaches, expired key identifiers are replaced with an all zero key identifier or any other dummy key identifier as would become apparent to one having ordinary skill in the art upon reading the present disclosure. In other approaches, expired key identifiers may be erased or otherwise destroyed in any manner known in the art. In at least one approach, expired keyIDs are kept in a log of keyIDs for another predetermined period of time for use in preventing unnecessary access warnings from other clients, as described with reference to other aspects of the present disclosure.

Operation 606 includes sending at least one key identifier of the set of key identifiers to the storage system with a data access request. The storage system is configured to determine whether the data access request is authorized for the at least one key identifier. In various approaches, the data access request is for at least one storage location for the data. The storage system determines whether the at least one key identifier is associated with (e.g., valid for) the storage location. In preferred approaches, the storage system determines whether the data access request is associated with a client and/or other user which has the appropriate encryption key to decrypt the data in a manner known in the art. In other approaches, the storage system may determine that operations associated with the data access request (e.g., read, write, read/write, etc.) is authorized for the at least one key identifier.

In some approaches, method 600 includes informing the storage system of the storage location(s) for which the at least one key identifier is authorized. The storage system is configured to determine whether the data access request is authorized for the at least one key identifier based at least in part on whether the data access request is directed to the storage location(s) for which the at least one key identifier is authorized.

In various approaches, in response to determining that the data access request is authorized for the at least one key identifier, the storage system may return the data (e.g., encrypted with the encryption key) to the client and/or other user which requested the data. A data access request which is not authorized for the at least one key identifier may be a data access request for a storage location which is not associated with the key identifier, a data access request associated with an expired key identifier, a data access request associated with an invalid key identifier, etc.

In preferred aspects, the storage system is configured to terminate the data access request in response to determining that the data access request is not authorized for the at least one key identifier. For example, the storage system may return an error in response to the data access request, the storage system may return a set of zeros in response to the data access request, the storage system may return a known key identifier that indicates that an error has occurred in response to the data access request, etc.

In some approaches, in response to determining that the data access request is not authorized, the storage system may issue an access warning or other security measure known in the art in a manner which would become apparent to one having ordinary skill in the art upon reading the present disclosure. In other approaches, the storage system may determine that the data access request is not authorized where the data access request is associated with an expired key identifier. In some aspects, at least one of the key identifiers of the set of key identifiers is associated with a temporal limitation (e.g., the key identifier expires after a predetermined period of time). In the foregoing approaches, the expired key identifier may be stored in a log. The storage system may avoid issuing an access warning for data access requests associated with expired key identifiers depending on the security requirements of the design as would be determinable by one having ordinary skill in the art.

In preferred aspects, the set of key identifiers includes a root key identifier and associated child key identifiers. In various approaches, child key identifiers are derived from the root key identifiers. Child key identifiers are preferably associated with a subset of privileges of the root key identifier. For example, child key identifiers may be temporary (e.g., associated with a temporal limitation). In contrast, the root key identifier may be a permanent key identifier which does not expire. In preferred aspects, the root key identifier is associated with full access privileges.

In at least some approaches, the set of key identifiers are generated and/or managed by a key identifier manager. The key identifier manager may generate the key identifiers in any manner described herein. The key identifier manager is preferably in communication with the storage system for storing and verifying key identifiers received from a client storing encrypted data on the storage system (e.g., where the encrypted data is associated with a set of key identifiers) and key identifiers received with data access requests. In preferred approaches, the encryption key is generated and/or managed by a key manager which is separate from the key identifier manager for the set of key identifiers. The key manager may be separated from the key identifier manager physically on separate devices, according to separate permissions, etc.

Figure 7:
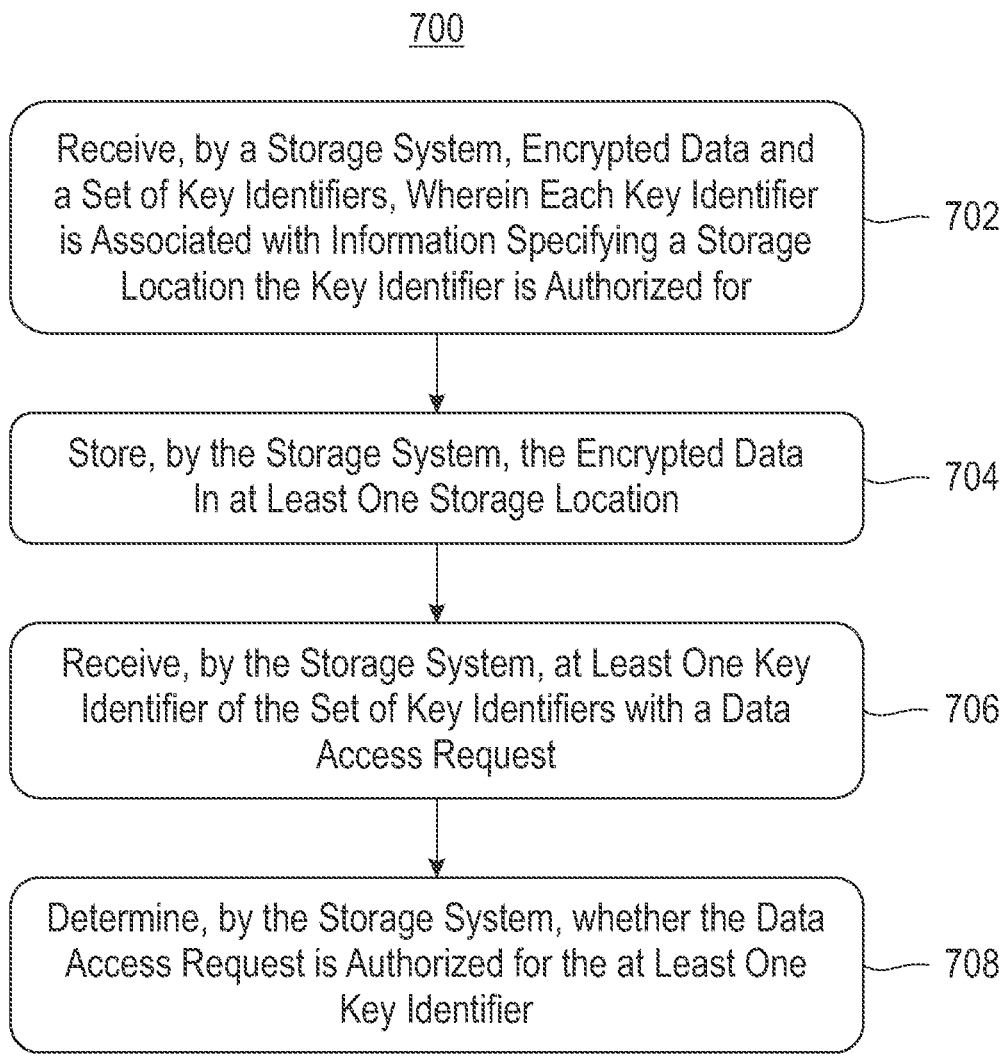
FIG. 7 is a flowchart of a method, in accordance with one aspect of the present invention.

Now referring to FIG. 7, a flowchart of a method 700 is shown according to one aspect. The method 700 may be performed in accordance with the present invention in any of the environments depicted in FIGS. 1-6, among others, in various aspects. Of course, more, or fewer operations than those specifically described in FIG. 7 may be included in method 700, as would be understood by one of skill in the art upon reading the present descriptions.

Each of the steps of the method 700 may be performed by any suitable component of the operating environment. For example, in various aspects, the method 700 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 includes operation 702. Operation 702 includes receiving, by a storage system, encrypted data and a set of key identifiers. In preferred approaches, a client on a client side system encrypts data using an encryption key in a manner known in the art for storage in the storage system. The storage system receives the encrypted data from the client, in various approaches. In some approaches, the client informs the storage system of each storage location that each key identifier is authorized for, to be described in further detail below.

In preferred aspects, the storage system does not have access to the encryption key. The encryption key is preferably associated with the set of key identifiers. In one approach, the encryption key may be pre-associated with the set of key identifiers. In some approaches, the encryption key is associated with the set of key identifiers after the encryption key is used to encrypt the data (e.g., in response to encrypting the data).

In preferred approaches, each key identifier is associated with information specifying a storage location (e.g., in the storage system) the key identifier is authorized for. In some approaches, a client informs the storage system of the information specifying the storage location each key identifier is authorized for. Each key identifier may be associated with information specifying a plurality of storage locations the key identifier is authorized for. A specified storage location may include a plurality and/or a range of storage locations the key identifier is authorized for. In various approaches, the key identifiers may be associated with information specifying overlapping and/or encompassing storage locations the key identifier is authorized for. For example, a first key identifier may be associated with a location L0 and a second key identifier may be associated with a subset of location L0 (e.g., L0.1).

In at least some approaches, at least one key identifier is associated with an attribute including a temporal limitation, an access limitation, a keyID level, etc. For example, at least one key identifier is associated with a temporal limitation where the keyID expires after a predefined period of time. In various approaches, expired key identifiers are replaced with an all zero key identifier or any other dummy key identifier as would become apparent to one having ordinary skill in the art upon reading the present disclosure. In other approaches, expired key identifiers may be erased or otherwise destroyed in any manner known in the art. In at least one approach, expired keyIDs are kept in a log of keyIDs for another predetermined period of time for use in preventing unnecessary access warnings from other clients, as described with reference to other aspects of the present disclosure.

Operation 704 includes storing, by the storage system, the encrypted data in at least one storage location. In various approaches, the client provides the encrypted data to the storage system where the storage system comprises a plurality of storage locations for the encrypted data. In some approaches, the storage system may store portions of the encrypted data in different storage locations. The storage system may store the encrypted data in the storage location(s) in any manner known in the art. In preferred approaches, the storage system manages and/or associates the storage locations and the key identifiers in any manner known in the art. For example, the storage system may associate each storage location with at least one key identifier in a table (e.g., based on the information provided by a client for each storage location that each key identifier is authorized for). Each storage location may be referred to as a region or a range interchangeably throughout the present disclosure.

Operation 706 includes receiving, by the storage system, at least one key identifier of the set of key identifiers with a data access request. The storage system may receive the at least one key identifier of the set of key identifiers with the data access request in any manner known in the art. In preferred approaches, the at least one key identifier and the data access request are received substantially at the same time. In some approaches, the at least one key identifier may be received with a plurality of data access requests.

Operation 708 includes determining, by the storage system, whether the data access request is authorized for the at least one key identifier. In various approaches, the data access request is for at least one storage location for the data. The storage system determines whether the at least one key identifier is associated with (e.g., valid for) the storage location. In preferred approaches, the storage system determines whether the data access request is associated with a client and/or other user which has the appropriate encryption key to decrypt the data in a manner known in the art. In other approaches, the storage system may determine that operations associated with the data access request (e.g., read, write, read/write, etc.) is authorized for the at least one key identifier. The storage system is configured to determine whether the data access request is authorized for the at least one key identifier based at least in part on whether the data access request is directed to the storage location(s) for which the at least one key identifier is authorized.

In various approaches, in response to determining that the data access request is authorized for the at least one key identifier, the storage system may return the data (e.g., encrypted with the encryption key) to the client and/or other user which requested the data. A data access request which is not authorized for the at least one key identifier may be a data access request for a storage location which is not associated with the key identifier, a data access request associated with an expired key identifier, a data access request associated with an invalid key identifier, etc.

In preferred aspects, the storage system is configured to terminate the data access request in response to determining that the data access request is not authorized for the at least one key identifier. For example, the storage system may return an error in response to the data access request, the storage system may return a set of zeros in response to the data access request, the storage system may return a known key identifier that indicates that an error has occurred in response to the data access request, etc.

In some approaches, in response to determining that the data access request is not authorized, the storage system may issue an access warning or other security measure known in the art in a manner which would become apparent to one having ordinary skill in the art upon reading the present disclosure. In other approaches, the storage system may determine that the data access request is not authorized where the data access request is associated with an expired key identifier. In some aspects, at least one of the key identifiers of the set of key identifiers is associated with a temporal limitation (e.g., the key identifier expires after a predetermined period of time). In the foregoing approaches, the expired key identifier may be stored in a log. The storage system may avoid issuing an access warning for data access requests associated with expired key identifiers depending on the security requirements of the design as would be determinable by one having ordinary skill in the art.

In preferred aspects, the set of key identifiers includes a root key identifier and associated child key identifiers. In various approaches, child key identifiers are derived from the root key identifiers. Child key identifiers are preferably associated with a subset of privileges of the root key identifier. For example, child key identifiers may be temporary (e.g., associated with a temporal limitation). In contrast, the root key identifier may be a permanent key identifier which does not expire. In preferred aspects, the root key identifier is associated with full access privileges.

In at least some approaches, the set of key identifiers are generated and/or managed by a key identifier manager. The key identifier manager may generate the key identifiers in any manner described herein. The key identifier manager is preferably in communication with the storage system for storing and verifying key identifiers received from a client storing encrypted data on the storage system (e.g., where the encrypted data is associated with a set of key identifiers) and key identifiers received with data access requests. In preferred approaches, the encryption key is generated and/or managed by a key manager which is separate from the key identifier manager for the set of key identifiers. The key manager may be separated from the key identifier manager physically on separate devices, according to separate permissions, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   receiving, by a storage system, encrypted data encrypted with an encryption key;
   receiving, by the storage system, a set of at least two key identifiers created for the encryption key, the key identifiers being unique relative to one another, wherein each key identifier is associated with information specifying a storage location for which the respective key identifier is authorized, wherein one of the key identifiers allows access to all of the data encrypted with encryption key, wherein another of the key identifiers allows access to only a portion of the data encrypted with the encryption key;
   storing, by the storage system, the encrypted data in at least one storage location;
   receiving, by the storage system, one of the key identifiers of the set of key identifiers with a data access request; and
   determining, by the storage system, whether the data access request is authorized for the received key identifier.

2. The computer-implemented method of claim 1, wherein a first of the key identifiers in the set is associated with information specifying a first specified storage location at which at least a portion of the encrypted data is stored in the storage system, wherein a second of the key identifiers in the set is associated with information specifying a second specified storage location that is a smaller subset of the first specified storage location.

3. The computer-implemented method of claim 1, wherein each of the key identifiers in the set is uniquely associated with a different user, wherein the key identifiers are associated with different permissions granted to the associated users to access the encrypted data encrypted with the encryption key.

4. The computer-implemented method of claim 1, comprising:
   terminating the data access request in response to determining that the data access request is not authorized for the received key identifier;
   in response to determining that the data access request is authorized for the received key identifier, fulfilling the data access request using the encryption key;
   receiving, by the storage system, a second of the key identifiers of the set of key identifiers with a second data access request;
   determining, by the storage system, whether the second data access request is authorized for the received second key identifier; and
   in response to determining that the second data access request is authorized for the received second key identifier, fulfilling the second data access request using the encryption key.

5. The computer-implemented method of claim 1, wherein at least one of the key identifiers of the set of key identifiers is associated with a limit in a number of operations allowed using the at least one of the key identifiers.

6. The computer-implemented method of claim 1, wherein a first of the key identifiers of the set of key identifiers is associated with a temporal limitation whereby the first key identifier expires; and comprising, in response to a determination that a time period specified by the temporal limitation has expired, adding the expired first key identifier to a log of expired key identifiers.

7. The computer-implemented method of claim 1, wherein the determining whether the data access request is authorized for the received key identifier is based at least in part on whether the data access request is directed to the specified storage location for which the received key identifier is authorized.

8. A system, comprising:
   a hardware processor; and
   logic integrated with the processor, executable by the processor, or integrated with and executable by the processor, the logic being configured to perform the method of claim 1.

9. A computer program product for controlling access to encrypted data on a storage system, the computer program product comprising:
   one or more computer readable storage media, and program instructions collectively stored on the one or more computer readable storage media, the program instructions comprising:
   program instructions to perform the method of claim 1.

10. A computer program product, the computer program product comprising: one or more computer readable storage media, and program instructions collectively stored on the one or more computer readable storage media, the program instructions comprising:

program instructions to encrypt data using an encryption key, wherein the encryption key is associated with a set of unique key identifiers that are usable to restrict access to a subset of privileges associated with decryption of the data using the encryption key, wherein one of the key identifiers allows access to all of the data encrypted with encryption key, wherein another of the key identifiers allows access to only a portion of the data encrypted with the encryption key;

program instructions to provide a storage system with the set of key identifiers, wherein each key identifier is associated with information specifying a respective storage location the key identifier is authorized for when processing a request to decrypt the encrypted data located at the respective storage location using the encryption key; and program instructions to send at least one key identifier of the set of key identifiers to the storage system with a data access request, wherein the storage system is configured to determine whether the data access request is authorized for the at least one key identifier.

11. The computer program product of claim 10, wherein the storage system does not have access to the encryption key.

12. The computer program product of claim 10, wherein the key identifiers for the encryption key are associated with different respective users whereby each of the key identifiers is associated with a unique one of the users, wherein the key identifiers are associated with different permissions granted to the associated users to access the encrypted data encrypted with the encryption key.

13. The computer program product of claim 10, wherein the set of key identifiers includes a root key identifier that allows the access to all of the data encrypted with encryption key and associated child key identifiers that allow access to portions of the data encrypted with the encryption key.

14. The computer program product of claim 10, wherein a first key identifier of the set of key identifiers is associated with a temporal limitation whereby the first key identifier expires in response to passage of a predetermined period of time.

15. The computer program product of claim 10, wherein at least two of the key identifiers are associated with different regions of the encrypted data stored in the storage system.

16. The computer program product of claim 10, wherein the key identifiers are generated and/or managed by a key identifier manager, wherein the encryption key is generated and/or managed by a key manager which is separate from the key identifier manager.

17. The computer program product of claim 10, comprising program instructions to associate the encryption key with the key identifiers in the set in response to encrypting the data.

18. The computer program product of claim 10, comprising program instructions to inform the storage system of the storage location(s) for which the at least one key identifier is authorized, wherein the storage system is configured to determine whether the data access request is authorized for the at least one key identifier based at least in part on whether the data access request is directed to the storage location(s) for which the at least one key identifier is authorized.

19. A system, comprising:
the computer program product as recited in claim 10; and
a hardware processor configured to execute the program instructions.

20. A system, comprising:
a client side system, the client side system comprising:
a first processor; and
logic integrated with the first processor, executable by the first processor, or integrated with and executable by the first processor, the logic being configured to:
encrypt, by the first processor, data using an encryption key, wherein the encryption key is associated with a set of key identifiers usable to restrict access to a subset of privileges for decrypting the data using the encryption key, wherein a first key identifier of the set of key identifiers expires in response to passage of a predetermined period of time and all future data access requests using the first key identifier after expiration of said first key identifier are denied;
provide, by the first processor, a storage system with the set of key identifiers, wherein each key identifier is associated with information specifying a storage location the key identifier is authorized for;
send, by the first processor, at least one key identifier of the set of key identifiers to the storage system with a data access request, wherein the storage system is configured to determine whether the data access request is authorized for the at least one key identifier; and
the storage system, the storage system comprising:
a second processor; and
logic integrated with the second processor, executable by the second processor, or integrated with and executable by the second processor, the logic being configured to:
receive, by the second processor, the encrypted data and the set of key identifiers;
store, by the second processor, the encrypted data in at least one storage location;
receive, by the second processor, one of the key identifiers of the set of key identifiers with the data access request;
determine, by the second processor, whether the data access request is authorized for the received key identifier;
in response to determining that the data access request is authorized for the received key identifier, fulfilling the data access request using the encryption key;
receiving, by the second processor, a second of the key identifiers of the set of key identifiers with a second data access request;
determining, by the second processor, whether the second data access request is authorized for the received second key identifier; and
in response to determining that the second data access request is authorized for the received second key identifier, fulfilling the second data access request using the encryption key.

* * * * *